United States Patent [19]

Benazzi et al.

[11] Patent Number: 6,123,831
[45] Date of Patent: Sep. 26, 2000

[54] CATALYST COMPRISING A ZEOLITE SELECTED FROM THE GROUP FORMED BY ZEOLITES NU-85, NU-86 AND NU-87, AN ELEMENT FROM GROUP VB AND ITS USE IN THE HYDROCONVERSION OF HYDROCARBON PETROLEUM CHARGES

[75] Inventors: Eric Benazzi, Chatou; Nathalie Marchal-George, Saint Genis Laval; Fabrice Diehl; Slavik Kasztelan, both of Rueil Malmaison, all of France

[73] Assignee: Institut Francais du Petrole, Rueil-Malmaison Cedex, France

[21] Appl. No.: 09/320,269

[22] Filed: May 27, 1999

[30] Foreign Application Priority Data

May 28, 1998 [FR] France ................................... 98 06777

[51] Int. Cl.⁷ ..................................................... C10G 47/00
[52] U.S. Cl. .................. 208/111.2; 208/109; 208/111.35; 208/111.01; 502/64; 502/66
[58] Field of Search .................................. 208/109, 111.2, 208/111.35, 111.01; 502/64, 66

[56] References Cited

U.S. PATENT DOCUMENTS 5,464,799  11/1995  Casci et al. ................................ 502/65
5,648,558   7/1997  Hatano et al. ........................... 568/618
5,932,088   8/1999  Benazzi et al. ........................... 208/27
5,969,203  10/1999  Dorbon et al. ........................... 585/324
6,036,846   3/2000  Benazzi et al. ....................... 208/111.3

*Primary Examiner*—Tom Dunn
*Attorney, Agent, or Firm*—Millen, White, Zelano & Branigan, P.C.

[57] ABSTRACT

The invention concerns a hydrocracking catalyst comprising at least one amorphous or poorly crystallised matrix of oxide type, at least one element from group VB, preferably niobium, at least one zeolite selected from the group formed by zeolites NU-85, NU-86 and NU-87, and at least one element selected among boron and silicon, optionally P, optionally at least one element selected from the elements from group VIB and group VIII, and/or optionally at least one element from group VIIA. The invention also concerns the use of that catalyst in the hydrocracking of hydrocarbon charges.

24 Claims, No Drawings

CATALYST COMPRISING A ZEOLITE SELECTED FROM THE GROUP FORMED BY ZEOLITES NU-85, NU-86 AND NU-87, AN ELEMENT FROM GROUP VB AND ITS USE IN THE HYDROCONVERSION OF HYDROCARBON PETROLEUM CHARGES

The present invention concerns a catalyst for the hydrocracking of hydrocarbon charges, said catalyst comprising at least one amorphous or poorly crystallised matrix of oxide type, at least one element (metal) from group VB, preferably niobium, at least one zeolite selected from the group formed by zeolites NU-85, NU-86 and NU-87, optionally at least one element (metal) selected from group VIB and group VIII of the periodic system of elements, preferably molybdenum and tungsten, cobalt, nickel and iron. The catalyst also contains an element selected among boron and silicon. optionally phosphorus, and/or optionally at least one element VIIA (halogens group) such as for example fluorine.

The present invention also concerns processes for the preparation of said catalyst as well as the use thereof for hydrocracking hydrocarbon charges such as petroleum cuts, cuts produced from coal containing aromatic and/or olefinic and/or naphthenic and/or paraffinic compounds, which charges optionally contain metals and/or nitrogen and/or oxygen and/or sulphur.

Hydrocracking heavy petroleum cuts is a very important procedure in refining which, taking surplus heavy charges of which little use can be made, makes it possible to produce lighter fractions such as gasolines, jet fuels and light gas oils that the refiner seeks to adapt his production to the structure of the demand involved. Some hydrocracking processes also make it possible to obtain a substantially purified residue which can constitute excellent bases for oils. In comparison with catalytic cracking, the attraction of catalytic hydrocracking is that it furnishes medium distillates, jet fuels and gas oils of very good quality. The gasoline produced has a much lower octane number than that resulting from catalytic cracking.

The catalysts used in hydrocracking are all of the dual-function type associating an acid function with a hydrogenating function. The acid function is afforded by carriers of large surface areas (150 to 800 $m^2 \cdot g^{-1}$ generally) affording surface acidity such as halogenated aluminas (in particular chlorinated or fluorinated), combinations of aluminium and boron oxides, amorphous silica-aluminas and zeolites. The hydrogenating function is afforded by one or more metals from group VIII of the periodic system of elements such as iron, cobalt, nickel, ruthenium, rhodium, palladium, osmium, iridium and platinum, or by an association of at least one metal from group VI of the periodic system such as molybdenum and tungsten and at least one metal from group VIII.

The balance between the two acid and hydrogenating functions is the fundamental parameter which governs the activity and selectivity of the catalyst. A weak acid function and a strong hydrogenating function give catalysts of little activity, operating at a temperature which is generally elevated (equal to or higher than 390° C.) and at a low spatial feed velocity (the VVH expressed in terms of volume of charge to be treated per unit of volume of catalyst and per hour is generally less than or equal to 2). but enjoying a very good level of selectivity in respect of medium distillates. Conversely, a strong acid function and a weak hydrogenating function give catalysts which are active but which afford less good levels of selectivity in respect of medium distillates. The search for a suitable catalyst will therefore be centred on a judicious choice of each of the functions to adjust the activity/selectivity pairing of the catalyst.

Thus, it is one of the great attractions of hydrocracking that it affords a high degree of flexibility at various levels: flexibility at the level of catalysts used, which affords flexibility in terms of the charges to be treated, and at the level of the products obtained. A parameter which is easy to govern is the acidity of the carrier of the catalyst.

In regard to the great majority thereof, conventional catalytic hydrocracking catalysts are formed by weakly acid carriers such as for example amorphous silica-aluminas. Those systems are more particularly used to produce medium distillates of very good quality and also, when their acidity is very weak, oil bases.

Among carriers which are not very acid, the family of amorphous silica-aluminas can be found. Many commercially available hydrocracking catalysts are based on silica-alumina associated either with a metal from group VIII or, preferably when the contents of heteroatomic poisons in the charge to be treated exceed 0.5% by weight, with an association of sulphides of metals from groups VIB and VIII. Those systems have good selectivity in respect of medium distillates and the products formed are of high quality. At least in regard to the least acid amongst them, those catalysts can also produce lubricant bases. As indicated above however the disadvantage of all these catalytic systems with an amorphous canner base is their low level of activity.

Catalysts comprising for example zeolite Y of structural type FAU or catalysts comprising for example a zeolite of beta type have a level of catalytic activity which is higher than that of amorphous silica-aluminas but they have levels of selectivity in respect of light products, which are higher.

On the other hand, simple sulphides of elements from group VB have been described as constituents of catalysts for the hydrorefining of hydrocarbon charges, such as for example niobium trisulphide. in U.S. Pat. No. 5,294,333. Mixtures of simple sulphides comprising at least an element from group VB and an element from group VIB have also been tested as constituents of catalysts for the hydrorefining of hydrocarbon charges, as for example in U.S. Pat. No. 4,910,181 or U.S. Pat. No. 5,275,994.

The research work carried out by the applicants in relation to numerous zeolites and crystallised microporous solids and active hydrogenating phases led them to discover that surprisingly a catalyst for the hydrocracking of hydrocarbon charges comprising at least one amorphous or poorly crystallised matrix which is generally porous such as alumina, at least one element from group VB of the periodic system of elements such as tantalum, niobium and vanadium, preferably niobium, at least zeolite selected from the group formed by zeolites NU-85, NU-86 and NU-87, optionally at least one element from group VIB of said periodic system such as chromium, molybdenum and tungsten, preferably molybdenum or tungsten, still more preferably molybdenum, optionally an element from group VIII, that is to say an element selected from the group formed by Fe, Ru, Os, Co, Rh, Ir, Ni, Pd and Pt, preferably iron, cobalt or nickel, an element chosen among boron, and silicon, optionally phosphorus and/or optionally an element from group VIIA and preferably fluorine, makes it possible to achieve levels of activity, that is to say a level of conversion, which are higher than with the catalysts known from the state of the art.

That catalyst has a more substantial degree of hydrocracking activity than those of the catalytic formulae based on an element from group VIB which are known from the state of the art. Without wishing to be bound down to any theory, it seems that this particularly high level of activity of the catalysts of the present invention is due to the particular properties of the sulphide of the element from group VB. The presence of such a sulphide having acid properties allows not only an improvement in the cracking properties but in addition an improvement in the hydrogenating. hydrodesulphurising and hydrodenitrogenising properties in relation to the sulphide of the element from croup VIB and in particular the molybdenum or tungsten sulphide which are usually employed for the hydrogenating function.

The catalyst of the present invention generally contains in percent by weight with respect to the total mass of the catalyst:

- 0.1 to 99.8%, preferably 0.1 to 90%, still more preferably 0.1 to 80%, and very preferably 0.1 to 70%, of at least one zeolite selected from the group formed by zeolites NU-85, NU-86 and NU-87,
- 0.1 to 60%, preferably 0.1 to 50% and still more preferably 0.1 to 40%, of at least one element selected from group VB,
- 0.1 to 99%, preferably 1 to 99%, of at least one amorphous or poorly crystallised porous mineral matrix of oxide type, the catalyst being charactenrsed in that it contains:

- 0 to 60%. preferably 0.1 to 50% and still more preferably 0.1 to 40%, of at least one element selected from the elements from group VIB and group VIII.
- 0.1 to 15% and more preferably 0.1 to 10%, of at least one promoter element selected among silicon and boron, not including silicon which is possibly contained in the structure of zeolite, and optionally again
- 0 to 20%, preferably 0.1 to 15% and more preferably 0.1 to 10%, of phosphorus and/or at least one element selected from group VIIA, preferably fluorine.

When it is present the promoter element silicon is in amorphous form located primarily on the matrix. The elements from groups VB, VIB and group VIII of the catalyst of the present invention can be present totally or partially in metallic and/or oxide and/or sulphur form.

The catalysts of the invention can be prepared by any of the methods known to the man skilled in the art.

A preferred process for preparation of the catalyst according to the present invention comprises the following steps:

a) drying and weighing a solid referred to as the precursor, containing at least the following components: at least one matrix, at least one zeolite selected from the group formed by zeolites NU-85, NU-86 and NU-87, optionally at least one element selected from the elements from group VIB and group VIII, optionally at least one element selected among boron and silicon, and optionally phosphorus, optionally at least one element from group VIIA, the whole preferably being shaped, b) calcining the dry solid obtained in step a) at a temperature of at least 150° C., c) impregnating the precursor solid defined in step b) by a solution containing at least one element from group VB, preferably niobium, d) leaving the moist solid at rest in a moist atmosphere at a temperature of between 10 and 120° C., and e) drying the moist solid obtained in step b) at a temperature of between 60 and 150° C.

Preparation of the precursor of above-indicated step a) can be implemented using any of the conventional methods known to the man skilled in the art. In accordance with a preferred preparation process, the precursor is obtained by mixing the matrix and the zeolite selected from the group formed by zeolites NU-85, NU-86 and NU-87, then shaped, dried and calcined. The elements from VIB, VIII and those selected from boron and silicon , optionally phosphorus and group VIIA are then introduced by any method known to the man skilled in the art, at any one of steps a) to e), before or after the shaping operation and before or after calcination of said mixture.

The shaping operation can be effected for example by extrusion, pelleting, by the oil-drop method, by granulation using a rotary disc or by any other method which is well known to the man skilled in the art. At least one calcination operation can be effected after any one of the steps in the preparation procedure, it is usually effected in air at a temperature of at least 150° C., preferably at least 300° C. Thus the product obtained at the end of step a) and/or step e) and/or possibly after the introduction of the element or elements from groups VIB and VIII and those selected among boron and silicon, optionally phosphorus, and the elements from group VIIA is then possibly calcined in air, usually at a temperature of at least 150° C., preferably at least 250° C., more preferably between about 350 and 1000° C.

The hydrogenating element can be introduced at any step In the preparation procedure, preferably in the mixing operation or very preferably after the shaping operation. The shaping, operation is followed by a calcination operation and the hydrogenating element is introduced before or after the calcination operation. The preparation procedure is terminated in all cases by a calcination operation at a temperature of 250 to 600° C. One of the methods preferred in the present Invention involves mixing, at least one zeolite selected from the group formed by zeolites NU-85, NU-86 and NU-87 in a moist gel of alumina for some tens of minutes, then passing the paste obtained in that way through a die to form extrudates of a diameter of between 0.4 and 4 mm. The hydrogenating function can then be introduced in part only (the case for example of the associations of oxides of metals from groups VIB and VIII) or entirely at the moment of mixing the zeolite, that is to say at least one zeolite selected from the group formed by zeolites NU-85, NU-86 and NU-87 with at least one oxide gel selected as the matrix. It can be introduced by means of one or more ton exchange operations on the calcined carrier formed by at least one zeolite selected from the group formed by zeolites NU-85, NU-86 and NU-87, which is dispersed in at least one matrix, by means of solutions containing the precursor salts of the metals selected when they belong, to group VIII. It can be introduced by one or more operations for impregnation of the shaped and calcined carrier, by means of a solution of precursors of the oxides of the metals of group VIII (in particular cobalt and nickel) when the precursors of the oxides of the metals of group VIB (in particular molybdenum or tungsten) have been previously introduced at the moment of mixing the carrier. They can finally be introduced by means of one or more operations for impregnation of the calcined carrier formed by at least one zeolite selected from the group formed by zeolites NU-85, NU-86 and NU-87 and at least one matrix, by means of Solutions containing the precursors of the oxides of the metals of groups VIB and/or VIII, the precursors of the oxides of metals from group VIII preferably being introduced after those from group VIB or at the same time as the latter.

Preferably, the carrier is impregnated by an aqueous solution. Impregnation of the carrier is preferably effected by the impregnation method referred to as the "dry" method, which is well known to the man skilled in the art. The impregnation operation can be implemented in a single step by means of a solution containing all of the constituent elements of the final catalyst.

The boron and/or silicon, and optionally phosphorus and/or the element selected from group VIIA of the halide ions, preferably fluorine, can be introduced into the catalyst at various levels in the preparation process using any procedure known to the man skilled in the art.

A method which is preferred in accordance with the invention comprises depositing the selected promoter element or elements, for example the boron-silicon pairing, on the precursor which has or has not been calcined, preferably having been calcined. For that purpose, the procedure involves preparing an aqueous solution of at least one boron salt such as ammonium biborate or ammonium pentaborate in an alkaline medium and in the presence of hydrogen peroxide, and implementing an impregnation operation referred to as dry impregnation, wherein the volume of the pores of the precursor is filled by the solution containing boron. When for example silicon is deposited, use will be made for example of a solution of a compound of silicon of silicone type.

The deposit of boron and silicon can also be effected simultaneously by using for example a solution containing a boron salt and a compound of silicon of silicone type. Thus for example in the case where the precursor is a catalyst of nickel-molybdenum type supported on alumina and zeolite selected from the group formed by zeolites NU-85, NU-86 and NU-87, it is possible to impregnate that precursor with aqueous solution of ammonium biborate and silicone Rhodorsil EP1 from Rhone-Poulenc, to effect a drying operation for example at 80° C., then to impregnate it with a solution of ammonium fluoride, to effect a drying operation for example at 80° C., and to effect a calcination operation for example and preferably in air in a traversed bed, for example at 500° C. for a period of 4 hours. The element from group VB is then deposited using any method known to the man skilled in the art.

The promoter element selected among silicon and boron, optionally phosphorus and/or the element selected from the halide ions from group VIIA can be introduced by means of one or more impregnation operations with an excess of solution onto the calcined precursor.

Thus for example it is possible to impregnate the precursor with an aqueous solution of ammonium biborate and/or silicone Rhodorsil EP1 from Rhone-Poulenc, to effect a drying operation for example at 80° C., then to effect impregnation with a solution of ammonium fluoride, to effect a drying operation for example at 80° C., and to effect a calcination operation for example and preferably in air in a traversed bed procedure, for example at 500° C. for a period of 4 hours. The element from group VB is then deposited using any method known to the man skilled in the art.

Other impregnation sequences can be used to produce the catalyst of the present invention.

It is for example possible to impregnate the precursor with a solution containing one of the promoter elements (B, Si, optionally P, VIIA), to effect drying and calcination and then to impregnate the solid obtained with the solution containing another promoter element, and then to effect drying followed by calcination. It is also possible to impregnate the precursor with a solution containing two of the promoter elements, and to effect drying and calcination followed by impregnation of the solid obtained with the solution containing another promoter element, followed by drying and final calcination.

The element from group VB is then deposited using any method known to the man skilled in the art.

The catalyst of the present invention may contain an element (metal) from group VIII such as iron, cobalt, nickel, ruthenium, rhodium, palladium, osmium, iridium or platinum. Among the elements from group VIII, the preference is to use an element selected from the group formed by iron, cobalt, nickel and ruthenium. Advantageously, the following associations of elements are used: nickel-niobium-molybdenum, cobalt-niobium-molybdenum, iron-niobium-molybdenum, nickel-niobium-tungsten, cobalt-niobium-tungsten, iron-niobium-tungsten, the preferred associations being as follows: nickel-niobium-molybdenum and cobalt-niobium-molybdenum. It is also possible to use associations of four elements, for example nickel-cobalt-niobium-molybdenum. It is also possible to use associations containing a noble metal such as ruthenium-niobium-molybdenum or ruthenium-nickel-niobium-molybdenum.

In the case where the elements are introduced in a plurality of impregnation operations in respect of the corresponding precursor salts, an intermediate catalyst calcination step will have to be implemented at a temperature of between 250 and 600° C.

Impregnation of the molybdenum can be facilitated by the addition of phosphoric acid in solutions of ammonium paramolybdate, which makes it possible for phosphorus also to be introduced so as to promote catalytic activity. Other compounds of phosphorus can be used, as is well known to the man skilled in the art.

The impregnation of niobium can be facilitated by the addition of oxalic acid and optionally ammonium oxalate in solutions of niobium oxalate. Other compounds can be used to improve solubility and to facilitate impregnation of the niobium, as is well known to the man skilled in the art.

Sulphurisation of the solids containing at least one element from group VB in oxide form is found to be very difficult by means of most of the conventional sulphurisation methods known to the man skilled in the art. Indeed for example catalysts containing at least one element from group VB supported on a matrix of the alumina type are known to be very difficult to sulphurise once the element of group VB-alumina association has been calcined at a temperature of higher than 200° C.

Sulphurisation can be effected by any method known to the man skilled in the art. The preferred method of the invention involves heating the non-calcined catalyst in a flow of a hydrogen-hydrogen sulphide mixture or in a flow of a nitrogen-hydrogen sulphide mixture or in pure hydrogen sulphide at a temperature of between 150 and 800° C., preferably between 250 and 600 °C., generally in a traversed-bed reaction zone. Thus for example in the preferred situation in which the element from group VB is niobium and the element from group VIB is molybdenum, it is possible to impregnate the carrier, for example the alumina-NU-85 mixture, with ammonium heptamolybdate, to effect a drying operation at 80° C., then to effect impregnation using niobium oxalate, to effect a drying operation at 80° C. and to implement sulphurisation for example and preferably using $H_2S$ in a traversed bed, for example at 500° C. for a period of 10 hours.

The zeolites NU-85, NU-86 and NU-87 which are possibly involved in the composition of the catalysts of the present invention are described hereinafter.

The zeolite NU-85 which is used in this patent is described in EP-A2-462745. The zeolites NU-85 which are involved in the composition according to the invention are used with the proportions of silicon and aluminium obtained at the end of the synthesis operation.

The zeolite NU-86 in hydrogen form or partially in hydrogen form, designated H-NU-86, is obtained by calcination and/or ion exchanges of the untreated zeolite NU-86 resulting from the synthesis operation, and possibly employed in the process according to the invention. Synthesis operations for such zeolites are described in patent application EP-0 463 768.

The structural type of that zeolite has not yet been officially attributed by the Synthesis Commission of the IZA (International Zeolite Association). However, following the work published at the 9th International Zeolite Conference by J. L. Casci, P. A. Box and M. D. Shannon ("Proceedings of the 9th International Zeolite Conference, Montreal 1992, Eds R. Von Ballmoos et al., 1993 by Butterworth) it seems that:

zeolite NU-86 has a three-dimensional microporous system; and that three-dimensional microporous system is formed by straight passages whose pore opening is delimited by 11 T atoms (tetrahedral atoms: Si, Al, Ga, Fe.), straight passages delimited alternately by openings with 10 and 12 T atoms and sinusoidal passages which are also alternately delimited by openings with 10 and 12 T atoms.

The term opening of pores with 10, 11 or 12 tetrahedral (T) atoms is used to denote pores constituted by 10 11 or 12 sides.

The zeolite NU-86 used in the composition according to the invention is at least in part and preferably practically totally in acid form, that is to say in hydrogen form (H+). The Na/T atomic ratio is generally less than 90% and preferably less than 50% and still more preferably less than 10%. The zeolites NU-86 which are involved in the composition of the invention are used with the proportions of silicon and aluminium obtained at the end of the synthesis operation.

As regards the zeolite NU-87 of structural type NES which is possibly used in the present invention it is described in EP-A1-377291 and in the document "Atlas of Zeolite Structure Types" by W. M. Meier, D. H. Olson and Ch. Baerlocher, Fourth revised edition 1996, Elsevier.

Use will preferably be made of zeolites NU-86 and NU-87 which are at least in part in acid form (and preferably entirely in form H) or partially exchanged with metallic cations, for example cations of alkaline-earth metals.

The zeolites NU-87 which are involved in the composition of the invention are used with the proportions of silicon and aluminium obtained in the synthesis operation.

The porous mineral matrix which is usually amorphous or poorly crystallised is generally formed by at least one refractory oxide in amorphous or poorly crystallised form. The matrix is usually selected from the group formed by alumina, silica, silica-alumina or a mixture of at least two of the above-mentioned oxides. It is also possible to select aluminates. It is preferred to use matrices containing alumina, in all its forms known to the man skilled in the art, for example gamma alumina.

The sources of element from group VB which can be used are well known to the man skilled in the art. For example, among the sources of niobium, it is possible to use oxides such as diniobium pentaoxide $Nb_2O_5$, niobic acid $Nb_2O_5.H_2O$, niobium hydroxides and polyoxoniobates, niobium alkoxides of the formula $Nb(OR_1)_3$ in which $R_1$ is an alkyl radical, niobium oxalate $NbO(HC_2O_4)_5$ and ammonium niobate. The preference is to use niobium oxalate or ammonium niobate.

The source of sulphur can be elementary sulphur, carbon disulphide, hydrogen sulphide, sulphur-bearing hydrocarbons such as dimethyl sulphide and dimethyl disulphide, mercaptans, compounds of thiophene, thiols, polysulphides such as for example ditertiononylpolysulphide or TPS-37 from ATOCHEM, sulphur-rich petroleum cuts such as gasoline, kerosene, gas oil, alone or in the form of mixtures with one of the above-mentioned sulphur-bearing compounds. The preferred sulphur source is carbon disulphide or hydrogen sulphide.

The preferred source of phosphorus is orthophosphoric acid $H_3PO_4$ but its salts and esters such as ammonium phosphates are also suitable. The phosphorus for example can be introduced in the form of a mixture of phosphoric acid and a basic organic compound containing nitrogen such as ammonia, primary and secondary amines, cyclic amines, compounds of the family of pyridine and quinolines and compounds of the family of pyrrole.

Numerous sources of silicon can be employed. Thus. it is possible to use ethyl orthosilicate $Si(OEt)_4$, siloxanes, polysiloxanes, silicones, emulsions of silicones, silicates of halides such as ammonium fluorosilicate $(NH_4)_2SiF_6$ or sodium fluorosilicate $Na_2SiF_6$. Silicomolybdic acid and its salts, silicotungstic acid and its salts can also advantageously be employed. The silicon can be added for example by impregnation of ethyl silicate in solution in a water/alcohol mixture. The silicon can also be added for example by impregnation of a compound of silicone type which is put into suspension in water.

The source of boron can be boric acid, preferably orthoboric acid $H_3BO_3$, ammonium pentaborate or biborate, boron oxide or boric acids. The boron for example can be introduced in the form of a mixture of boric acid, hydrogen peroxide and a basic organic compound containing nitrogen such as ammonia, primary and secondary amines, cyclic amines, compounds of the family of pyridine and quinolines and compounds of the family of pyrrole. The boron can be introduced for example by means of a solution of boric acid in a wvater/alcohol mixture.

The sources of elements of group VIIA which can be used are well known to the man skilled in the art. For example fluoride anions can be introduced in the form of hydrofluoric acid or salts thereof. Those salts are formed with alkali metals, ammonium or an organic compound. In the latter case the salt is advantageously formed in the reaction mixture by reaction betwveen the organic compound and hydrofluoric acid. It is also possible to use hydrolysable compounds which can liberate fluoride anions in water such as ammonium fluorosilicate $(NH_4)_2SiF_6$, silicon tetrafluoride $SiF_4$ or sodium tetrafluoride $Na_2SiF_6$. The fluorine can be introduced for example by impregnation of an aqueous solution of hydrofluoric acid or ammonium fluoride.

The sources of elements from group VIB which can be used are well known to the man skilled in the art. For example, among the sources of molybdenum and tungsten, it is possible to use oxides and hydroxides, molybdic and tungstic acids and their salts, in particular ammonium salts such as ammonium molybdate, ammonium heptamolybdate, ammonium tungstate, phosphomolybdic acid, phosphotungstic acid and salts thereof, silicomolybdic acid, silicotungstic acid and salts thereof. The preference is to use ammonium oxides and salts such as ammonium molybdate, ammonium heptamolybdate and ammonium tungstate.

The sources of elements from group VIII which can be used are well to the man skilled in the art. For example, for the non-noble metals, use will be made of nitrates, sulphates, phosphates, halides, for example, chlorides, bromides and fluorides and carboxylates, for example acetates and carbonates. For the noble metals, use will be made of halides, for example chlorides, nitrates, acids such as chloroplatinic acid, and oxychlorides such as ammoniacal ruthenium oxychloride.

The catalysts obtained by the present invention are shaped in the form of grains of different shapes and dimensions. They are used in general in the form of extrudates which are cylindrical or polylobate such as bilobate and trilobate, and polylobate of straight or twisted shape, but they can also be produced and employed in the form of crushed powder, tablets, rings, balls and wheel shapes. They have a specific surface area as measured by nitrogen adsorption using the BET method (Brunauer, Emmett, Teller, J. Am. *Chem. Soc.*, vol. 60, 309–316 (1938)) of between 50 and 600 m$^2$/g, a pore volume as measured by mercury porosimetry of between 0.2 and 1.5 cm$^3$/g and a pore size distribution which can be monomodal, bimodal or polymodal.

The catalysts obtained by the present invention are used for the hydrocracking of hydrocarbon charges such as petroleum cuts. The charges used in the process are gasolines, kerosenes, gas oils, vacuum gas oils, atmospheric residues, vacuum residues, atmospheric distillates, vacuum distillates, heavy fuel oils, waxes and paraffins, used oils, deasphalted crudes or residues, charges resulting from thermal or catalytic conversion processes and mixtures thereof. They contain heteroatoms such as sulphur, oxygen and nitrogen and possibly metals.

The catalysts obtained in that way are advantageously used for hydrocracking in particular heavy hydrocarbon cuts of the type of vacuum distillates, deasphalted or hydrotreated residues or equivalent. The heavy cuts are preferably formed by at least 80% by volume of compounds whose boiling points are at least 350° C. and preferably between 350 and 580° C. (that is to say corresponding to compounds containing at least 15 to 20 carbon atoms). They generally contain heteroatoms such as sulphur and nitrogen. The nitrogen content is usually between 1 and 5000 ppm by weight and the sulphur content is between 0.01 and 5% by weight.

The conditions of the hydrocracking operation such as temperature, pressure, hydrogen recycling rate and volume velocity per hour can be highly variable in dependence on the nature of the charge, the quality of desired products and the installations available to the refiner. The temperature is generally higher than 200° C. and is preferably between 250° C. and 480° C. The pressure is higher than 0.1 MPa and is preferably higher than 1 MPa. The hydrogen recycling rate is at a minimum 50 and is often between 80 and 5000 normal litres of hydrogen per litre of charge. The volume velocity per hour is generally between 0.1 and 20 volumes of charge per volume of catalyst and per hour.

The catalysts of the present invention are preferably subjected to a sulphurisation treatment which makes it possible for the metal species to be at least partially transformed into sulphide before they are brought into contact with the charge to be treated. That sulphurisation activation treatment is well known to the man skilled in the art and can be implemented by means of any method which has already been described in the literature, either in situ, that is to say in the hydrocracking reactor, or ex situ.

A conventional sulphurisation method which is well known to the man skilled in the art involves heating in the presence of hydrogen sulphide at a temperature of between 150 and 800° C., preferably between 250 and 600° C., generally in a traversed-bed reaction zone.

The catalyst of the present invention can advantageously be used for hydrocracking cuts of vacuum distillates type heavily charged with sulphur and nitrogen, more particularly for example, cuts with a sulphur content of higher than 0.1% by weight and a nitrogen content of greater than 10 ppm.

In a first mode of implementation or partial hydrocracking which is also referred to as gentle hydrocracking, the conversion level is less than 55%. The catalyst according to the invention is then employed at a temperature which is generally higher than or equal to 230° C., preferably between 300° C. at 480° C. and more preferably between 350° C. and 450° C. The pressure is preferably higher than 2 MPa. more preferably 3 MPa and is preferably less than 12 MPa, more preferably less than 10 MPa. The amount of hydrogen is at a minimum 100 normal litres of hydrogen per litre of charge and is preferably between 200 and 3000 normal litres of hydrogen per litre of charge. The volume velocity per hour is preferably between 0.15 and 10 volumes of charge per volume of catalyst and per hour. Under those conditions the catalysts of the present invention have a better level of activity in terms of conversion, hydrodesulphurisation and hydrodenitrogenisation than commercial catalysts.

In a second mode of implementation the catalyst of the present invention can be employed for the partial hydrocracking, advantageously under conditions of moderate hydrogen pressure, of cuts for example of vacuum distillates type heavily charged with sulphur and nitrogen, which have been previously subjected to hydrotreatment. In that mode of hydrocracking the level of conversion is less than 55%. In this case the petroleum cut conversion process takes place in two steps, the catalysts according to the invention being used in the second step. The catalyst of the first step has a hydrotreatment function and comprises a preferably alumina-based matrix which preferably does not contain any zeolite and at least one metal having a hydrogenating function. The matrix is an amorphous or poorly crystallised porous mineral matrix of oxide type. Aluminas, silicas and silica-aluminas can be mentioned by way of non-limiting example. It is also possible to choose aluminates. The preference is to use matrices containing alumina, in all the forms known to the man skilled in the art and still more preferably aluminas, for example gamma alumina. The hydrotreatment function is effected by at least one metal or compound of metal from group VIII such as nickel and cobalt in particular. It is possible to use a combination of at least one metal or compound of metal from group VIB (for example molybdenum or tungsten) and at least one metal or compound of metal from group VIII (for example cobalt or nickel) of the periodic system of elements. The total concentration of oxides of metals from groups VIB and VIII is preferably between 5 and 40% by weight and more preferably between 7 and 30% by weight and the weight ratio expressed in terms of oxide of the metal (or metals) from group VIB to oxide of metal (or metals) from group VIII is preferably between 1.25 and 20 and more preferably between 2 and 10. In addition that catalyst may contain phosphorus. The content of phosphorus expressed as a concentration of diphosphorus pentaoxide $P_2O_5$, will preferably be at most 15%, more preferably between 0.1 and 15% by weight and very preferably between 0.15 and 10% by weight. It may also contain boron in a B/P ratio which is preferably between 1.05 and 2 (atomic), the sum of the contents of boron (B) and phosphorus (P) expressed in respect of oxides preferably being between 5 and 15% by weight.

The first step generally takes place at a temperature of between 350 and 460° C., preferably between 360 and 450° C., with a total pressure of at least 2 MPa. preferably at least 3 MPa, a volume velocity per hour of between 0.1 and 5 volumes of charge per volume of catalyst and per hour, preferably between 0.2 and 2 volumes of charge per volume of catalyst and per hour, and with an amount of hydrogen of at least 100 normal litres per litre of charge and preferably between 260 and 3000 normal litres per litre of charge.

For the conversion step with the catalyst according to the invention (or second step) the temperatures are generally higher than or equal to 230° C. and often between 300° C. and 480° C. and preferably between 300 and 450° C. The pressure is generally at least 2 MPa and preferably at least 3 MPa. The amount of hydrogen is at a minimum 100 litres of hydrogen per litre of charge and is preferably between 200 and 3000 litres of hydrogen per litre of charge. The volume velocity per hour is preferably between 0.15 and 10 volumes of charge per volume of catalyst and per hour. Under those conditions the catalysts of the present invention have improved activity in terms of conversion, hydrodesulphurisation and hydrodenitrogenisation and improved selectivity in respect of medium distillates than the commercial catalysts. The service life of the catalysts is also improved in the moderate pressure range.

In another embodiment the catalyst of the present invention can be used for hydrocracking under elevated hydrogen pressure conditions of at least 5 MPa. The cuts treated are for example of vacuum distillates type heavily charged with sulphur and nitrogen, which have been previously subjected to hydrotreatment. In this hydrocracking procedure the level of conversion is higher than 55%. In this case the petroleum cut conversion process takes place in two steps, the catalyst according to the invention being used in the second step.

The catalyst in the first step has a hydrotreatment function and comprises a matrix which is preferably based on alumina and preferably does not contain zeolite, and at least one metal having a hydrogenating function. The matrix may also be formed by or contain silica. Silicas-aluinna, boron oxide, magnesia, zirconia, titanium oxide or a combination of those oxides. The hydrodehydrogenating function is effected by at least one metal or compound of metal from Croup VIII such as nickel or cobalt in particular. It is possible to use a combination of at least one metal or compound of metal from group VIB (for example molybdenum or tungsten) and at least one metal or compound of metal from group VIII (for example cobalt or nickel) of the periodic system of elements. The total concentration of respect of oxides of metals from groups VIB and VIII is preferably between 5 and 40% by weight and more preferably between 7 and 30% by weight and the weight ratio expressed in terms of metal oxide in respect of metal (or metals) from group VIB to metal (or metals) from group VIII is preferably between 1.25 and 20 and more preferably between 2 and 10 In addition the catalyst may possibly contain phosphorus. The amount of phosphorus expressed in terms of concentration of diphosphorus pentaoxide $P_2O_5$ will preferably be at most 15%, more preferably between 0.1 and 15% by weight and very preferably between 0.15 and 10% by weight. It may also contain boron in a B/P ratio which is preferably between 1.02 and 2 (atomic), the sum of the contents of boron (B) and phosphorus (P) expressed in terms of oxides preferably being between 5 and 15% by weight.

The first step generally takes place at a temperature of between 350 and 460° C., preferably between 360 and 450° C. at a pressure of at least 2 MPa, preferably at least 3 MPa, with a volume velocity per hour of between 0.1 and 5 volumes of charge per volume of catalyst and per hour, preferably between 0.2 and 2 volumes of charge per volume of catalyst and per hour and with an amount of hydrogen of at least 100 normal litres of hydrogen per litre of charge and preferably between 260 and 3000 normal litres of hydrogen per litre of charge.

For the conversion step with the catalyst according to the invention (or second step), the temperatures are generally higher than or equal to 230° C., often between 300° C. and 480° C. and preferably between 330° C. and 440° C. The pressure is generally higher than 5 MPa and preferably higher than 7 MPa. The amount of hydrogen is at a minimum 100 litres of hydrogen per litre of charge and preferably between 200 and 3000 litres of hydrogen per litre of charge. The volume velocity per hour is preferably between 0.15 and 10 volumes of charge per volume of catalyst and per hour.

Under those conditions the catalysts of the present invention afford better activity in terms of conversion than commercial catalysts, even for zeolite contents which are considerably lower than those of the commercial catalysts. The following Examples illustrate the present invention without however limiting the scope thereof.

EXAMPLE 1

Preparation of a Carrier for a Hydrocracking Catalyst Containing a Zeolite NU-85

A carrier for a hydrocracking catalyst containing a zeolite NU-85 was produced in large quantities so as to be able to prepare different catalysts based on the same carrier. The raw material used is a zeolite NU-85 which is prepared in accordance with Example 4 of EP 462 745 A2 and has an overall Si/Al atomic ratio equal to 13.1 and a Na/Al atomic ratio equal to 0.23.

That zeolite NU-85 is firstly subjected to a calcination operation referred to as dry calcination at 550° C. in a flow of dry air for a period of 20 hours. The solid obtained is then subject to four ion exchanges in a solution of $NH_4NO_3$ 10 N, at about 100° C., for a period of 4 hours for each exchange. The solid obtained in that way is referenced $NH_4$-NU-85/1 and has a Si/Al ratio equal to 13.8 and a Na/Al ratio equal to 0.005. Its other physico-chemical characteristics are set out in Table 1.

TABLE 1

| Sample | Adsorption | |
|---|---|---|
| | $S_{BET}$ ($m^2$/g) | $V(P/P_0 = 0.19)$ ml liquid $N_2$/g |
| $NH_4$-NU-85/1 | 436 | 0.18 |

18.6 grams of zeolite $NH_4$-NU-85/1, prepared as described above is in a first phase mixed and then worked with 81.4 grams of a matrix composed of ultrafine tabular boehmite or alumina gel marketed under the name SB3 by Condea Chemie GmbH. That powder mixture is then mixed with an aqueous solution containing nitric acid in a proportion of 66% (7% by weight of acid per gram of dry gel) and then worked for a period of 15 minutes. At the end of that working operation, the paste obtained is passed through a die having cylindrical openings of a diameter equal to 1.4 mm.

EXAMPLE 2

Preparation of a Carrier Containing a Zeolite NU-86

A carrier for hydrocracking catalyst containing a zeolite NU-86 was produced in large quantities so as to be able to prepare different catalysts based on the same carrier. The raw material used is a zeolite NU-86 which is prepared in accordance with Example 2 of EP 0 463 768 A2 and has an overall Si/Al atomic ratio equal to 10.2 and a Na/Al atomic ratio equal to 0.25.

That untreated zeolite NU-86 straight from the synthesis operation is firstly subjected to a calcination operation referred to dry calcination at 550° C. in a flow of dry air for a period of 9 hours. The solid obtained is then subjected to four ion exchanges in a solution of $NH_4NO_3$ 10 N at about 100° C. for a period of 4 hours for each exchange. The solid obtained in that way is referenced $NH_4$-NU-86/1 and has a Si/Al ratio of 10.4 and a Na/Al ratio of 0.013. Its other physico-chemical characteristics are set out in Table 2.

TABLE 2

| Sample | X Diffraction crystallinity (%) | Adsorption $S_{BET}$ ($m^2/g$) | $V(P/P_0 = 0.19)$ ml liquid $N_2$/g |
|---|---|---|---|
| $NH_4$-NU-86/1 | 100 | 423 | 0.162 |

The crystallites of zeolite NU-86 occur in the form of crystals whose size varies from 0.4 μm to 2 μm.

Then 19.5 g of zeolite $NH_4$-NU-86/2 is mixed with 80.5 g of a matrix composed of ultrafine tabular boehmite or alumina gel marketed under the name SB3 by Condea Chemie GmbH. That powder mixture is then mixed with an aqueous solution containing nitric acid in a proportion of 66% by weight (7% by weight of acid per gram of dry gel) and then worked for a period of 15 minutes. The worked paste is then extruded through a die of a diameter of 1.4 mm. The extrudates are then calcined at 500° C. for a period of 2 hours in air.

EXAMPLE 3

Preparation of a Carrier for a Hydrocracking Catalyst Containing a Zeolite NU-87

The raw material used is a zeolite NU-87 which has an overall Si/Al atomic ratio equal to 17.2 and a proportion by weight of sodium corresponding to a Na/Al atomic ratio equal to 0.144. That zeolite NU-87 was synthesised in accordance with Example 1 of European patent application EP-A-0 377 291.

That zeolite NU-87 is firstly subjected to a calcination operation referred to as dry calcination at 550° C. in a flow of dry air for a period of 6 hours. Then the solid obtained is subjected to four ion exchanges in a solution of $NH_4NO_3$ 10 N at about 100° C. for a period of 4 hours for each exchange. The solid obtained in that way is referenced $NH_4$-NU-87 and has a Si/Al ratio of 17.4 and a Na/Al ratio of 0.002. Its other physico-chemical characteristics are set out in Table 3.

TABLE 3

| | X Diffraction: Parameters | | | | | | Adsorption | |
|---|---|---|---|---|---|---|---|---|
| Sample | a (Å) | b (Å) | c (Å) | β (°) | V (Å$^3$) | Cryst.$^{(1)}$ (%) | $S_{BET}$ ($m^2/g$) | $V^{(2)}$ |
| $NH_4$—NU-87 | 14.35 | 22.34 | 25.14 | 151.53 | 3840 | 100 | 466 | 0.19 |

$^{(1)}$Crystallinity,
$^{(2)}$V at P/Po = 0.19 in ml liquid $N_2$/g

A carrier for a hydrocracking catalyst containing a zeolite NU-87 is produced in the following manner: 20% by weight of a zeolite NU-87 is used, which is mixed with 80% by weight of alumina of type SB3 supplied by Condea. That worked paste is then extruded through a die of a diameter of 1.4 mm. The extrudates are then dried overnight at 120° C. in air and then calcined at 550° C. in air.

EXAMPLE 4

Preparation of Hydrocracking Catalysts Containing a Zeolite NU-85

The carrier extrudates prepared in Example 1 are impregnated dry by a solution of a mixture of ammonium heptamolybdate and nickel nitrate and finally calcined in air at 550° C. in situ in the reactor. The proportions by weight in terms of oxides of the catalyst NiMo 1 obtained are set out in Table 4.

The carrier extrudates of Example 1 are also impregnated dry by a solution of a mixture of ammonium heptamolybdate, nickel nitrate and orthophosphoric acid and finally calcined in air at 550° C. in situ in the reactor. The proportions by weight of oxides in the catalyst NiMo1P obtained are indicated in Table 4.

We impregnated the sample of catalyst NiMo IP described hereinbefore with an aqueous solution containing ammonium biborate and the emulsion of silicone Rhodorsil EP1 so as to deposit about 1.8% by weight of $B_2O_3$ and about 1.6% by weight of $SiO_2$. After drying overnight at 120° and calcination at 550° C. for a period of 2 hours in dry air the catalyst NiMo1PBSi is obtained. The final proportions of oxides in the catalysts NiMo1 are set out in Table 4.

The carrier extrudates containing a zeolite NU-85 of Example 1 are impregnated dry with an aqueous solution of ammonium heptamolybdate, dried overnight at 120° C. in air and finally calcined in air at 550° C. The proportions by weight of oxides in the catalyst Mo1 obtained are set out in Table 5.

The catalyst Mo1 was then impregnated with an aqueous solution containing ammonium biborate to achieve a deposit of 1.8% by weight of $B_2O_3$. After ageing at ambient temperature in a water-saturated atmosphere the impregnated extrudates are dried overnight at 120° C. and then calcined at 550° C. for a period of 2 hours in dry air. A catalyst referred to as Mo1B is obtained. In the same way a catalyst Mo1Si is prepared by impregnation of the catalyst Mo1 with an emulsion of silicone Rhodorsil EP1 (Rhone-Poulenc) so as to deposit 1.8% by weight of $SiO_2$. The impregnated extrudates are then dried overnight at 120° C. and then calcined at 550° C for a period of 2 hours in dry air. Finally a catalyst Mo1BSi is obtained by impregnation of the catalyst Mo1 with an aqueous solution containing ammonium biborate and the emulsion of silicone Rhodorsil EP1 (Rhone-Poulenc) so as to deposit 1.8% by weight of $B_2O_3$ and 1.8% by weight of $SiO_2$. The impregnated extrudates are then dried overnight at 120° C. and then calcined at 550° C. for a period of 2 hours in dry air.

The carrier extrudates prepared in Example 1 are impregnated dry with a solution of nickel nitrate and calcined in air at 550° C. so as to obtain the catalyst Ni1 containing about 3.9% by weight of NiO. We then impregnated the sample of catalyst Ni1 with an aqueous solution containing an emulsion of silicone Rhodorsil EP1 so as to deposit about 2.3% by weight of $SiO_2$. After drying overnight at 120° C. and calcination at 550° C. for 2 hours in dry air the catalyst Ni1Si is obtained. Then, fluorine is added to that catalyst by impregnation with a solution of dilute hydrofluoric acid so as to deposit about 1% by weight of fluorine. After drying overnight at 120° C. and calcination at 550° C. for a period of 2 hours in dry air, the catalyst Ni1SiF is obtained. The final proportions of oxides in the catalysts Ni1 are set out in Table 6.

EXAMPLE 5
Preparation of Hydrocracking Catalysts Containing a Zeolite NU-85 and Niobium Some catalysts of foregoing, Example 4 are impregnated with an aqueous solution of niobium oxalate $Nb(HC_2O_4)_5$, oxalic acid and ammonium oxalate. The aqueous solution containing niobium is prepared from a volume of one litre of water in which 30 g of oxalic acid and 33 g of ammonium oxalate are dissolved. When the solution is clear the solution is heated to 55° C. and niobium oxalate is added in the amount necessary to deposit the desired proportion on the catalyst. For example 92.3g of niobium oxalate in 1330 ml of the solution of oxalic acid and ammonium oxalate makes it possible to deposit about 4% by weight of niobium on the catalyst.

These catalysts are impregnated by the method referred as using a solution excess. The 1330 ml of solution is brought into contact with 380 g of catalyst. After two hours, the extrudates are recovered. They are then dried overnight at 120° C. in a flow of dry air.

The final proportions of oxides in the catalysts NiMo1Nb obtained from the catalysts NiMo1 are set out in Table 4.

The final proportions of oxides in the catalysts Mo1Nb obtained from the catalysts Mo1 are set out in Table 5 and those of the catalysts Ni1Nb obtained from the catalysts Ni1 are set out in Table 6.

Nonetheless to obtain the catalyst Ni1NbSiF, fluorine is added by impregnation with a solution of dilute hydrofluoric acid to the catalyst Ni1NbSi so as to deposit about 1% by weight of fluorine. After drying overnight at 120° C. and calcination at 550° C. for a period of 2 hours in dry air the catalyst Ni1NbSiF is obtained.

TABLE 4

Characteristics of the catalysts NiMo1 and NiMo1Nb containing zeolite NU-85

| Catalyst | NiMo1 | NiMo1 Nb | NiMo1 P | NiMo1 PBSi | NiMo1 NbPBSi |
|---|---|---|---|---|---|
| $MoO_3$ (% wt) | 14.3 | 13.4 | 13.7 | 13.2 | 12.4 |
| $Nb_2O_5$ (% wt) | 0 | 6.8 | 0 | 0 | 6.5 |
| NiO (% wt) | 3.1 | 2.9 | 2.9 | 2.8 | 2.6 |
| $P_2O_5$ (% wt) | 0 | 0 | 4.8 | 4.7 | 4.4 |
| $B_2O_3$ (% wt) | 0 | 0 | 0 | 1.7 | 1.6 |
| $SiO_2$ (% wt) overall | 14.4 | 13.3 | 13.6 | 14.7 | 13.8 |
| Majority of make-up to 100% composed of $Al_2O_3$ (% wt) | 68.2 | 63.6 | 65.0 | 62.9 | 58.7 |

TABLE 5

Characteristics of the catalysts Mo1 and Mo1Nb containing zeolite NU-85

| Catalyst | Mo1 | Mo1 Nb | Mo1 B | Mo1 NbB | Mo1 Si | Mo1 NbSi | Mo1 BSi | Mo1 NbBSi |
|---|---|---|---|---|---|---|---|---|
| $MoO_3$ (% wt) | 14.6 | 13.7 | 14.4 | 13.4 | 14.4 | 13.4 | 14.1 | 13.2 |
| $Nb_2O_5$ (% wt) | 0 | 6.5 | 0 | 6.4 | 0 | 6.4 | 0 | 6.3 |
| $P_2O_5$ (% wt) | 0 | 0 | 0 | 0 | 0 | 0 | 0 | 0 |
| $B_2O_3$ (% wt) | 0 | 0 | 1.8 | 0 | 0 | 0 | 1.75 | 1.7 |
| $SiO_2$ (% wt) | 14.8 | 13.8 | 14.5 | 13.6 | 16.1 | 15.3 | 15.9 | 15.0 |
| Majority of make-up to 100% composed of $Al_2O_3$ (% wt) | 70.6 | 66.0 | 69.3 | 66.6 | 69.5 | 64.9 | 68.2 | 63.8 |

TABLE 6

Characteristics of the catalysts Ni1 and Ni1Nb containing zeolite NU-85

| Catalyst | Ni1 | Ni1 Nb | Ni1 Si | Ni1 NbSi | Ni1 SiF | Ni1 NbSiF |
|---|---|---|---|---|---|---|
| NiO (% wt) | 3.9 | 3.7 | 3.8 | 3.6 | 3.7 | 3.6 |
| $Nb_2O_5$ (% wt) | 0 | 4.2 | 0 | 4.4 | 0 | 4.3 |
| F (% wt) | 0 | 0 | 0 | 0 | 1.15 | 1.1 |
| $SiO_2$ (% wt) | 16.7 | 16.0 | 18.6 | 17.8 | 18.4 | 17.6 |
| Majority of make-up to 100% composed of $Al_2O_3$ (% wt) | 79.4 | 76.1 | 77.6 | 74.2 | 76.7 | 73.4 |

EXAMPLE 6
Preparation of Hydrocracking Catalysts Containing a Zeolite NU-86

The carrier extrudates of Example 2 are impregnated dry with an aqueous solution of a mixture of ammonium heptamolybdate and nickel nitrate, dried overnight at 120° C. in air and finally calcined in air at 550° C. That gives the catalyst NiMo2.

The carrier extrudates of Example 2 are impregnated dry with a solution of a mixture of ammonium heptamolybdate, nickel nitrate and orthophosphoric acid, and finally calcined in air at 550° C. in situ in the reactor. That gives the catalyst NiMo2P.

Finally, a catalyst-NiMo2PBSi was obtained by impregnation of the catalyst NiMo2P using the same procedure as the foregoing catalysts but employing an aqueous solution containing ammonium biborate and the emulsion of silicone Rhodorsil EP1 so as to deposit 2.0% by weight of $B_2O_3$ and 1.6% by weight of $SiO_2$. After drying overnight at 120° C. and calcination at 550° C. for a period of 2 hours in dry air the result obtained is the catalyst NiMo2PBSi. The final proportions of oxides in the catalysts NiMo2 are set forth in Table 7.

The carrier extrudates containing a zeolite NU-86 of Example 2 are moreover impregnated dry with an aqueous solution of ammonium heptamolybdate, dried overnight at 190° C. in air and finally calcined in air at 550° C. to produce the catalyst Mo2. That catalyst is then impregnated with an aqueous solution containing ammonium biborate to obtain a deposit of 2% by weight of $B_2O_3$. After ageing at ambient temperature in a water-saturated atmosphere the impregnated extrudates are dried overnight at 120° C. and then calcined at 550° C. for a period of 2 hours in dry air. The result obtained is a catalyst referred to as Mo2B. In the same manner, a catalyst Mo2Si is prepared by impregnation of the catalyst Mlo2 by means of an emulsion of silicone Rhodorsil EP1 (Rhone-Poulenc) so as to deposit 1.6% by weight of $SiO_2$. The impregnated extrudates are dried overnight at 120° C. and then calcined at 550° C. for a period of 2 hours in dry air. Finally a catalyst Mo2BSi was obtained by impregnation of the catalyst Mo2 with an aqueous solution containing ammonium biborate and the emulsion of silicone Rhodorsil EP1 (Rhone-Poulenc) so as to deposit 2.0% by weight of $B_2O_3$ and 1.6% by weight of $SiO_2$. The impregnated extrudates are then dried overnight at 120° C. and then calcined at 550° C. for a period of 2 hours in dry air.

EXAMPLE 7
Preparation of Hydrocracking Catalysts Containing a Zeolite NU-86 and Niobium Some catalysts of Example 6 hereinbefore are impregnated with an aqueous solution of niobium oxalate Nb(HC$_2$O$_4$)$_5$, oxalic acid and ammonium oxalate. The aqueous solution containing the niobium is prepared from a volume of one litre of water in which 30 g of oxalic acid and 33 g of ammonium oxalate are dissolved. When the solution is clear said solution is heated to 55° C. and niobium oxalate is added in the amount necessary to deposit the desired proportion on the catalyst. For example 92.3 g of niobium oxalate in 1330 ml of the solution of oxalic acid and ammonium oxalate makes it possible to deposit about 4% by weight of niobium on the catalyst.

The catalysts are impregnated with the method referred to as solution excess. The 1330 ml of solution is brought into contact with 380 g of catalyst. After two hours, the extrudates are recovered. They are then dried overnight at 120° C. in a flow of dry air.

The final contents of oxides in the catalysts NiMo2Nb obtained in that way are set forth in Table 7. The final contents of oxides in the catalysts Mo2Nb obtained in that way are set out in Table 8.

TABLE 7

Characteristics of the catalysts NiMo2 and NiMo2Nb containing zeolite NU-86

| Catalyst | NiMo2 | NiMo2 Nb | NiMo2 P | NiMo2 PBSi | NiMo2 NbPBSi |
|---|---|---|---|---|---|
| MoO$_3$ (% wt) | 14.1 | 13.1 | 13.4 | 12.9 | 12.1 |
| Nb$_2$O$_5$ (% wt) | 0 | 6.85 | 0 | 0 | 6.8 |
| NiO (% wt) | 3.2 | 2.9 | 3.1 | 2.9 | 2.9 |
| P$_2$O$_5$ (% wt) | 0 | 0 | 4.1 | 4.0 | 3.7 |
| B$_2$O$_3$ (% wt) | 0 | 0 | 0 | 1.9 | 1.8 |
| SiO$_2$ (% wt) overall | 14.7 | 13.7 | 14.1 | 15.2 | 14.1 |
| Majority of make-up to 100% composed of Al$_2$O$_3$ (% wt) | 68.0 | 63.4 | 65.3 | 63.1 | 58.7 |

TABLE 8

Characteristics of the catalysts Mo2 and Mo2Nb containing zeolite NU-86

| Catalyst | Mo2 | Mo2 Nb | Mo2 B | Mo2 NbB | Mo2 Si | Mo2 NbSi | Mo2 BSi | Mo2 NbB Si |
|---|---|---|---|---|---|---|---|---|
| MoO$_3$ (% wt) | 14.6 | 13.6 | 14.3 | 13.4 | 14.3 | 13.4 | 14.1 | 13.2 |
| Nb$_2$O$_5$ (% wt) | 0 | 6.35 | 0 | 6.4 | 0 | 6.3 | 0 | 6.4 |
| P$_2$O$_5$ (% wt) | 0 | 0 | 0 | 0 | 0 | 0 | 0 | 0 |
| B$_2$O$_3$ (% wt) | 0 | 0 | 1.8 | 1.9 | 0 | 0 | 1.6 | 1.90 |
| SiO$_2$ (% wt) | 15.2 | 14.2 | 14.9 | 13.9 | 16.6 | 15.5 | 16.1 | 15.1 |
| Majority of make-up to 100% composed of Al$_2$O$_3$ (% wt) | 70.2 | 65.8 | 69.0 | 64.4 | 69.1 | 64.7 | 67.9 | 63.4 |

EXAMPLE 8

Preparation of Hydrocracking Catalysts Containing a Zeolite NU-87

The carrier extrudates of Example 3 are impregnated dry with an aqueous solution of a mixture of ammonium heptamolybdate and nickel nitrate, dried overnight at 120° C. in air and finally calcined in air at 550° C. That gives the catalyst NiMo3.

The carrier extrudates of Example 3 are impregnated dry with an aqueous solution of a mixture of ammonium heptamolybdate, nickel nitrate and orthophosphoric acid, dried overnight at 120° C. in air and finally calcined in air at 550° C. That gives the catalyst NiMo3P.

The sample of catalyst NiMo3P is impregnated with an aqueous solution containing ammonium biborate and the emulsion of silicone Rhodorsil EP1 in such a way as to deposit 1.8% by weight of B$_2$O$_3$ and 1.5% by weight of SiO$_2$. After drying overnight at 120° C. and calcined at 550° C. for a period of 2 hours in dry air the result obtained is the catalyst NiMo3PBSi. The final proportions of oxides in the catalysts NiMo3 are set forth in Table 9.

The carrier extrudates containing a zeolite NU-87 of Example 3 are impregnated dry with an aqueous solution of ammonium heptamolybdate, dried overnight at 120° C. in air and finally calcined in air at 550° C. That gives the catalyst Mo3. That catalytic is then impregnated with an aqueous solution containing ammonium biborate to obtain a deposit of 1.5% by weight of B$_2$O$_3$. After ageing at ambient temperature in a water-saturated atmosphere the impregnated extrudates are dried overnight at 120° C. and then calcined at 550° C. for a period of 2 hours in dry air. The result obtained is a catalyst referred to as Mo3B. In the same manner, a catalyst Mo3Si was then prepared by impregnation of the catalyst Mo3 with an emulsion of silicone Rhodorsil EP1 (Rhone-Poulenc) so as to deposit 1.8% by weight of SiO$_2$. The impregnated extrudates are then dried overnight at 120° C. and then calcined at 550° C. for a period of 2 hours in dry air. Finally a catalyst Mo3BSi was obtained by impregnation of the catalyst Mo3 with an aqueous solution containing ammonium biborate and the emulsion of silicone Rhodorsil EP1 (Rhone-Poulenc) so as to deposit 1.5% by weight of B$_2$O$_3$ and 1.8% by weight of SiO$_2$. The impregnated extrudates are then dried overnight at 120° C. and then calcined at 550° C. for a period of 2 hours in dry air.

EXAMPLE 9

Preparation of Hydrocracking Catalysts Containing a Zeolite NU-87 and Niobium

Some catalysts of Example 8 hereinbefore are impregnated with an aqueous solution of niobium oxalate Nb(HC$_2$O$_4$)$_5$, oxalic acid and ammonium oxalate. The aqueous solution containing the niobium is prepared from a volume of one litre of water in which 30 g of oxalic acid and 33 g of ammonium oxalate are dissolved. When the solution is clear said solution is heated to 55° C. and niobium oxalate is added in the amount necessary to deposit the desired proportion on the catalyst. For example 92.3 of niobium oxalate in 1330 ml of the solution of oxalic acid and ammonium oxalate makes it possible to deposit about 4% by weight of niobium on the catalyst.

These catalysts are impregnated by the method referred to as the solution excess method. The 1330 ml of solution with the desired concentration of niobium is brought into contact with 380 g of catalyst. The extrudates are recovered after two hours. They are then dried overnight at 120° C. in a flow of dry air.

The final proportions of oxides in the catalysts NiMo3Nb and Mo3Nb obtained in that way are set forth in Tables 9 and 10 respectively.

TABLE 9

Characteristics of the catalysts NiMo3 and NiMo3Nb containing zeolite NU-87

| Catalyst | NiMo3 | NiMo3 Nb | NiMo3 P | NiMo3 PBSi | NiMo3 NbPBSi |
|---|---|---|---|---|---|
| $MoO_3$ (% wt) | 13.4 | 12.9 | 13.4 | 12.9 | 12.0 |
| $Nb_2O_5$ (% wt) | 0 | 7.1 | 0 | 0 | 7.15 |
| NiO (% wt) | 3.1 | 3.0 | 3.1 | 3.0 | 2.8 |
| $P_2O_5$ (% wt) | 0 | 0 | 4.35 | 4.2 | 3.9 |
| $B_2O_3$ (% wt) | 0 | 0 | 0 | 1.7 | 1.6 |
| $SiO_2$ (% wt) overall | 14.8 | 13.8 | 14.3 | 15.3 | 14.1 |
| Majority of make-up to 100% composed of $Al_2O_3$ (% wt) | 68.7 | 63.2 | 64.8 | 62.9 | 58.4 |

TABLE 10

Characteristics of the catalysts Mo3 and Mo3Nb containing zeolite NU-87

| Catalyst | Mo3 | Mo3 Nb | Mo3 B | Mo3 NbB | Mo3 Si | Mo3 NbSi | Mo3 BSi | Mo3 NbB Si |
|---|---|---|---|---|---|---|---|---|
| $MoO_3$ (% wt) | 14.3 | 13.3 | 14.0 | 13.1 | 14.0 | 13.1 | 13.8 | 12.9 |
| $Nb_2O_5$ (% wt) | 0 | 6.9 | 0 | 6.7 | 0 | 6.8 | 0 | 6.6 |
| $P_2O_5$ (% wt) | 0 | 0 | 0 | 0 | 0 | 0 | 0 | 0 |
| $B_2O_3$ (% wt) | 0 | 0 | 1.9 | 1.45 | 0 | 0 | 1.8 | 1.4 |
| $SiO_2$ (% wt) | 15.4 | 14.3 | 15.1 | 14.2 | 16.6 | 15.7 | 16.3 | 15.5 |
| Majority of make-up to 100% composed of $Al_2O_3$ (% wt) | 70.3 | 65.5 | 69.0 | 64.6 | 69.4 | 64.4 | 68.1 | 63.6 |

EXAMPLE 10
Comparison of Catalysts in Hydrocracking of a Vacuum Gas Oil With Partial Conversion The catalysts, the procedures for the preparation of which are described in the foregoing Examples, are used under moderate-pressure hydrocracking conditions on a petroleum charge, the main characteristics of which are as follows:

| | |
|---|---|
| Relative density (20/4) | 0.921 |
| Sulphur (% wt) | 2.46 |
| Nitrogen (ppm wt) | 1130 |
| Simulated distillation | |
| initial point | 365° C. |
| 10% point | 430° C. |
| 50% point | 472° C. |
| 90% point | 504° C. |
| final point | 539° C. |
| flow point | +39° C. |

The catalytic test unit comprises two fixed-bed reactors involving a rising charge circulation ("up-flow"). Taking the first reactor, being that into which the charge passes first, introduced therein is the first-step hydrotreatment catalyst HTH548 sold by Procatalyse comprising an element from group VI and an element from group VIII which are deposited on alumina. A hydrocracking catalyst as described hereinbefore is introduced into the second reactor, being that into which the charge passes last. 40 ml of catalyst is introduced into each of the reactors. The two reactors operate at the same temperature and the same pressure. The operating conditions of the test unit are as follows:

| | |
|---|---|
| Total pressure | 5 MPa |
| Hydrotreatment catalyst | 40 cm³ |
| Hydrocracking catalyst | 40 cm³ |
| Temperature | 400° C. |
| Hydrogen flow rate | 20 l/h |
| Charge flow rate | 40 cm³/h |

The two catalysts undergo an in-situ sulphurisation step prior to the reaction. Once the sulphurisation operation has been implemented, the charge described hereinbefore can be transformed.

The catalytic performances are expressed by gross conversion at 400° C. (GC), gross selectivity in respect of medium distillates (GS) and conversion in terms of hydrodesulphurisation (HDS) and hydrodenitrogenisation (HDN). Those catalytic performances are measured on the catalyst after a period of stabilisation, generally at least 48 hours, has been observed.

The gross conversion GC is taken to be equal to:

$$GC = \% \text{ by weight of } 380° \text{ C.}^{minus} \text{ of the effluent}$$

380° C.$^{minus}$ representing the fraction which is distilled at a temperature lower than or equal to 380° C.

The gross selectivity GS in respect of medium distillates is taken to be equal to:

$$GS = 100 * \text{ weight of the fraction } (150° \text{ C.} - 380° \text{ C.})/\text{weight of the fraction } 380° \text{ C.}^{minus} \text{ of the effluent.}$$

Conversion in terms of hydrodesulphurisation HDS is taken to be equal to:

$$HDS = (S_{sinitial} - S_{effluent})/S_{initial} * 100 = (24600 - S_{effluent})/24600 * 100$$

Conversion in terms of hydrodenitrogenisation HDN is taken to be equal to:

$$HDN = N_{(initial)} - N_{(effluent)}/N_{initial} * 100 = (1130 - N_{effluent})/1300 * 100$$

The following Tables set out gross conversion GC at 400° C., gross selectivity GS, conversion in terms of hydrodesulphurisation HDS and conversion in terms of hydrodenitrogenisation HDN for the catalysts.

TABLE 11

Catalytic activities of the catalysts NiMo1 based on NU-85 in partial hydrocracking at 400° C.

| Catalysts | GC (% wt) | GS | HDS (%) | HDN (%) |
|---|---|---|---|---|
| NiMo1 | 45.5 | 70.8 | 99.01 | 94.2 |
| NiMo1Nb | 46.3 | 70.5 | 99.15 | 95.1 |
| NiMo1P | 45.8 | 70.1 | 99.33 | 95.9 |
| NiMo1PBSi | 48.1 | 70.1 | 99.61 | 98.6 |
| NiMo1NbPBSi | 49.1 | 70.3 | 99.74 | 98.7 |

TABLE 12

Catalytic activities of the catalysts NiMo2 based on NU-86 in partial hydrocracking at 400° C.

| Catalysts | GC (% wt) | GS | HDS (%) | HDN (%) |
|---|---|---|---|---|
| NiMo2 | 49.6 | 59.7 | 98.7 | 95.7 |
| NiMo2Nb | 50.1 | 60.2 | 98.9 | 96.5 |
| NiMo2P | 49.7 | 59.5 | 98.3 | 95.5 |

TABLE 12-continued

Catalytic activities of the catalysts NiMo2 based on NU-86 in partial hydrocracking at 400° C.

| Catalysts | GC (% wt) | GS | HDS (%) | HDN (%) |
|---|---|---|---|---|
| NiMo2PBSi | 50.2 | 59.9 | 99.6 | 97.9 |
| NiMo2NbPBSi | 50.8 | 60.1 | 99.75 | 98.3 |

TABLE 13

Catalytic activities of the catalysts NiMo3 based on NU-87 in partial hydrocracking at 400° C.

| Catalysts | GC (% wt) | GS | HDS (%) | HDN (%) |
|---|---|---|---|---|
| NiMo3 | 47.7 | 68.1 | 98.6 | 95.0 |
| NiMo3Nb | 48.1 | 68.3 | 98.7 | 96.5 |
| NiMo3P | 47.8 | 68.2 | 99.1 | 95.3 |
| NiMo3PBSi | 49.1 | 68.9 | 99.4 | 98.1 |
| NiMo3NbPBSi | 49.5 | 68.0 | 99.7 | 98.6 |

The results in Tables 11, 12 and 13 show that the addition of niobium, boron and silicon to the nickel and molybdenum based catalysts supported on carriers containing alumina and a zeolite NU-85, NU-86 and NU-87 affords an improvement in the performances of the catalyst in terms of conversion, irrespective of the zeoliter that is to say higher levels of conversion for the same reaction temperature of 400° C. The catalysts according to the invention are therefore particularly attractive in terms of partial hydrocracking of a charge of vacuum distillates type containing nitrogen at a moderate hydrogen pressure.

EXAMPLE 11
Comparison of Catalysts in Hydrocracking of a Vacuum was Oil with a High Level of Conversion The catalysts, the procedures for the preparation of which are described in the foregoing Examples, are used under conditions of hydrocracking with a high level of conversion (60–100%). The petroleum charge is a hydrotreated vacuum distillate, the main characteristics of which are as follows:

| Relative density (20/4) | 0.869 |
|---|---|
| Sulphur (ppm wt) | 502 |
| Nitrogen (ppm wt) | 10 |
| Simulated distillation | |
| initial point | 298° C. |
| 10% point | 369° C. |
| 50% point | 427° C. |
| 90% point | 481° C. |
| final point | 538° C. |

That charge was obtained by hydrotreatment of a vacuum distill ate o n a catalyst HR360 sold by Procatalyse comprising an element from group VIB and an element from group VIII which are deposited on alumina.

Added to the charge are 0.6% by weight of aniline and 2% by weight of dimethyl disulphide in order to simulate the partial pressures of $H_2S$ and $NH_3$ present in the second hydrocracking step. The charge when prepared in that way is injected into the hydrocracking, test unit which comprises a fixed-bed reactor with a rising flow of the charge ("upflow"), into which 80 ml of catalyst is introduced. The catalyst is sulphurised by a mixture of n-hexane/DMDS+aniline at up to 320° C. Once the sulphurisation operation has been implemented, the charge described hereinbefore can be transformed. The operating conditions of the test unit are as follows:

| Total pressure | 9 MPa |
|---|---|
| Catalyst | 80 cm$^3$ |
| Temperature | 360–420° C. |
| Hydrogen flow rate | 80 l/h |
| Charge flow rate | 80 cm$^3$/h |

The catalytic performances are expressed by the temperature which makes it possible to achieve a level of gross conversion of 70% and by gross selectivity in respect of medium 150–380° C. distillates. Those catalytic performances are measured on the catalyst after a period of stabilisation, generally at least 48 hours, has been observed.

Gross conversion GC is taken to be equal to:

GC=% by weight of 380° C.$^{minus}$ of the effluent

Gross selectivity GS in respect of medium distillates is taken to be equal to:

GS=100* weight of the fraction (150° C.–380° C.)/weight of the fraction 380° C.$^{minus}$ of the effluent.

The reaction temperature is fixed in such a way as to attain a level of gross conversion GC equal to 70% by weight. Tables 14, 15 and 16 hereinafter set out the reaction temperature and the level of gross selectivity for the catalysts described in Tables 4 to 10.

TABLE 14

Catalytic activities of catalysts based on NU-85 in high-conversion (70%) hydrocracking

| | T(°C.) | GS |
|---|---|---|
| NiMo1 | 386 | 31.7 |
| NiMo1P | 385 | 31.7 |
| NiMo1PBSi | 383 | 32.4 |
| NiMo1NbPBSi | 381 | 32.4 |
| Mo1 | 387 | 29.3 |
| Mo1B | 386 | 29.9 |
| Mo1NbB | 384 | 28.1 |
| Mo1Si | 386 | 30.1 |
| Mo1NbSi | 384 | 28.7 |
| Mo1BSi | 384 | 30.4 |
| Mo1NbBSi | 383 | 30.3 |
| Ni1 | 388 | 28.9 |
| Ni1Si | 388 | 28.1 |
| Ni1NbSi | 386 | 30.3 |
| Ni1SiF | 385 | 29.0 |
| Ni1NbSiF | 384 | 30.6 |

TABLE 15

Catalytic activities of catalysts based on NU-86 in high-conversion (70%) hydrocracking

| | T(°C.) | GS |
|---|---|---|
| NiMo2 | 373 | 36.0 |
| NiMo2P | 371 | 36.2 |
| NiMo2PBSi | 367 | 36.3 |
| NiMo2NbPBSi | 365 | 37.5 |
| Mo2 | 373 | 34.1 |
| Mo2B | 373 | 33.9 |
| Mo2NbB | 371 | 34.7 |
| Mo2Si | 372 | 33.0 |

TABLE 15-continued

Catalytic activities of catalysts based on NU-86
in high-conversion (70%) hydrocracking

|          | T(°C.) | GS   |
|----------|--------|------|
| Mo2NbSi  | 370    | 35.1 |
| Mo2BSi   | 371    | 33.6 |
| Mo2NbBSi | 370    | 35.0 |

TABLE 16

Catalytic activities of catalysts based on NU-87
in high-conversion (70%) hydrocracking

|            | T(°C.) | GS   |
|------------|--------|------|
| NiMo3      | 384    | 30.6 |
| NiMo3P     | 383    | 32.5 |
| NiMo3PBSi  | 378    | 32.3 |
| NiMo3NbPBSi| 376    | 33.1 |
| Mo3        | 385    | 30.6 |
| Mo3B       | 384    | 30.3 |
| Mo3NbB     | 382    | 30.4 |
| Mo3Si      | 383    | 29.6 |
| Mo3NbSi    | 381    | 30.9 |
| Mo3BSi     | 383    | 29.1 |
| Mo3NbBSi   | 381    | 30.0 |

The results in Tables 14, 15 and 16 show that the addition of niobium, and/or boron, and/or silicon to the nickel and molybdenum based catalysts supported on carriers containing alumina and a zeolite NU-85, NU-86 and NU-87 (for example catalysts NiMo1NbPBSi, Mo2NbB or Mo3NbSi) affords an improvement in the performances of the catalyst in terms of conversion, irrespective of the zeolite, that is to say lower conversion temperatures to attain a level of conversion of 70% than the corresponding catalysts which are not in accordance with the invention (such as NiMo1, Mo2B or Mo3Si for example). The catalysts according to the invention containing niobium and/or boron, and/or silicon are therefore particularly attractive for hydrocracking a charge of vacuum distillates type containing nitrogen at a moderate to high hydrogen pressure.

In the same way, Tables 14, 15 and 16 demonstrate that the addition of niobium and/or boron, and/or silicon to the molybdenum based catalysts supported on carriers containing alumina and a zeolite NU-85, NU-86 or NU-87 also affords an improvement in the performances of the catalyst in terms of conversion, irrespective of the zeolite.

The catalysts of the invention containing niobium and boron or silicon are therefore particularly attractive for hydrocracking a charge of vacuum distillates type containing nitrogen at a moderate to high hydrogen pressure.

What is claimed is:

1. A catalyst comprising at least one amorphous or poorly crystallized oxide matrix, at least one element from group VB, at least one zeolite selected from the group consisting of zeolites NU-85. NU-86 and NU-87, and at least a promoter selected from the group consisting of boron and silicon.

2. A catalyst according to claim 1 further comprising phosphorus.

3. A catalyst according to claim 1 wherein the element from group VB is niobium.

4. A catalyst according to claim 1 further comprising at least one element selected from group VIB.

5. A catalyst according to claim 4 wherein the element from group VIB is molybdenum or tungsten.

6. A catalyst according to claim 1 further comprising at least one element selected from group VIII.

7. A catalyst according to claim 6 wherein the element from group VIII is iron, cobalt or nickel.

8. A catalyst according to claim 1 further comprising at least one element selected from group VIIA.

9. A catalyst according to claim 8 wherein the element from group VIIA is fluorine.

10. A catalyst according to claim 1 containing in percent by weight with respect to the total mass of the catalyst:
   0.1 to 99.8% of at least one zeolite selected from the group formed by zeolites NU-85, NU-86 and NU-87,
   0.1 to 60% of at least one element selected from group VB,
   0.1 to 99% of at least one amorphous or poorly crystallised porous mineral matrix of oxide type,
   0 to 60% of at least one element selected from the elements from croup VIB and group VIII,
   0.1 to 15% of at least one promoter element selected among silicon and boron, not including the silicon which is contained in the structure of zeolite, and
   0 to 20% of phosphorus and/or at least one element selected from group VIIA.

11. A process for the preparation of a catalyst according to claim 1 wherein:
   a) drying and weighing a solid pecursor, containing at least the following components: at least one matrix, at least one zeolite selected from the group consisting of zeolites NU-85, NU-86 and NU-87, at least one element selected from the group consisting of boron and silicon, and optionally at least one element selected from the elements from group VIB and group VIII, optionally phosphorus and/or at least one element from group VIIA, the whole optionally being shaped,
   b) calcining the dry solid obtained in step a) at a temperature of at least 150° C.,
   c) impregnating the precursor solid defined in step b) with a solution containing at least one element from group VB,
   d) maintaining the moist solid in a moist atmosphere at a temperature of between 10 and 120° C., and
   e) drying the moist solid obtained in step d) at a temperature of between 60 and 150° C.

12. A process for the preparation of a catalyst according to claim 11 wherein there is introduced into a mixture of at least one matrix with at least one zeolite selected from the group formed by zeolites NU-85, NU-86 and NU-87, before or after the shaping operation and before or after calcination of said mixture, at least one element selected from the elements from group VIII and group VIB.

13. A preparation process according to claim 11 wherein the catalyst is impregnated with at least one solution containing at least one element selected from the elements from group VIB and group VIII.

14. A preparation process according to claim 11 wherein the catalyst is impregnated with at least one solution containing at least one promoter element selected from silicon and boron.

15. A preparation process according to claim 11 wherein the catalyst is impregnated with at least one solution containing at least one element selected from the elements from group VIIA.

16. A preparation process according to claim 11 wherein at least one calcination operation is effected at the end of any one of the steps in the preparation procedure, at a temperature of at least 150° C.

17. A preparation process according to claim 11 wherein sulphurization of the catalyst is effected in a flow of a hydrogen/hydrogen sulphide mixture or in pure hydrogen sulphide, at a temperature of between 150 and 800° C.

18. In a process for catalytically hydrocracking hydrocarbon charges, the improvement comprising using the catalyst of claim 1.

19. A process according to claim 18 such that the charge comprising at least 80% by volume of compounds whose boiling points are at least 350° C.

20. A process according to claim 18 wherein the temperature is higher than 200° C. the pressure is higher than 0.1 MPa, the amount of hydrogen is at a minimum 50 litres of hydrogen per litre of charge, and the volume velocity per hour is between 0.1 and 20 volumes of charge per volume of catalyst and per hour.

21. A process according to claim 18 wherein the process comprises a mild hydrocracking process wherein the level of conversion is less than 55%, the temperature is higher than 230° C., the pressure is higher than 2 MPa and lower than 12 MPa, the amount of hydrogen at a minimum is 100 litres of hydrogen per litre of charge and the volume velocity per hour is between 0.15 and 10 volumes of charge per volume of catalyst and per hour.

22. A process according to claim 18 wherein the process comprises a hydrocracking process wherein conversion is higher than 55%, the temperature is higher than 230° C., the pressure is higher than 5 MPa, the amount of hydrogen is at a minimum 100 litres of hydrogen per litre of charge and the volume velocity per hour is between 0.15 and 10 volumes of charge per volume of catalyst and per hour.

23. A process according to claim 18 wherein a hydrotreatment step is effected prior to the hydrocracking step.

24. A process according to claim 23 wherein the hydrotreatment step is effected at a temperature of between 350° C. and 460° C., a pressure of at least 2 MPa, with an amount of hydrogen of at least 100 litres of hydrogen per litre of charge, and with a volume velocity per hour of between 0.1 and 5 volumes of charge per volume of catalyst and per hour.

* * * * *